(12) United States Patent
Reese et al.

(10) Patent No.: US 8,650,409 B1
(45) Date of Patent: Feb. 11, 2014

(54) FPGA CONFIGURATION DATA SCRAMBLING USING INPUT MULTIPLEXERS

(75) Inventors: Dirk Reese, Campbell, CA (US); Thomas H. White, Santa Clara, CA (US)

(73) Assignee: Altera Corporation, San Jose, CA (US)

( * ) Notice: Subject to any disclaimer, the term of this patent is extended or adjusted under 35 U.S.C. 154(b) by 3032 days.

(21) Appl. No.: 10/942,151

(22) Filed: Sep. 15, 2004

(51) Int. Cl.
*G06F 21/00* (2013.01)
(52) U.S. Cl.
USPC .......................................................... 713/189
(58) Field of Classification Search
USPC ........................................................... 713/189
See application file for complete search history.

(56) References Cited

U.S. PATENT DOCUMENTS

| | | | | |
|---|---|---|---|---|
| 5,559,889 A | * | 9/1996 | Easter et al. | 380/30 |
| 5,970,142 A | * | 10/1999 | Erickson | 713/189 |
| 6,295,606 B1 | * | 9/2001 | Messerges et al. | 713/189 |
| 6,441,641 B1 | * | 8/2002 | Pang et al. | 326/41 |
| 6,996,233 B2 | * | 2/2006 | Brokenshire et al. | 380/28 |
| 7,106,860 B1 | * | 9/2006 | Yu et al. | 380/37 |
| 7,142,671 B2 | * | 11/2006 | Qi et al. | 380/29 |
| 7,283,628 B2 | * | 10/2007 | Stein et al. | 380/29 |
| 7,295,671 B2 | * | 11/2007 | Snell | 380/28 |
| 7,366,829 B1 | * | 4/2008 | Luttrell et al. | 711/108 |

\* cited by examiner

*Primary Examiner* — Jason Gee
(74) *Attorney, Agent, or Firm* — Ropes & Gray LLP

(57) ABSTRACT

Circuits, methods, and apparatus that provide for protection of configuration bitstreams from theft. One exemplary embodiment receives a scrambled configuration bitstream with an integrated circuit. The scrambled configuration bitstream is descrambled using a plurality of multiplexers under control of a security key. A configuration bitstream is received in portions. One specific embodiment uses a key stored in memory to control a bank of multiplexers that descramble each of the received portions of the configuration bitstream. Other embodiments store longer keys, and use portions of the keys to descramble one or more portions of their respective configuration bitstreams. The outputs of the multiplexers are then stored in configuration memory cells.

8 Claims, 11 Drawing Sheets

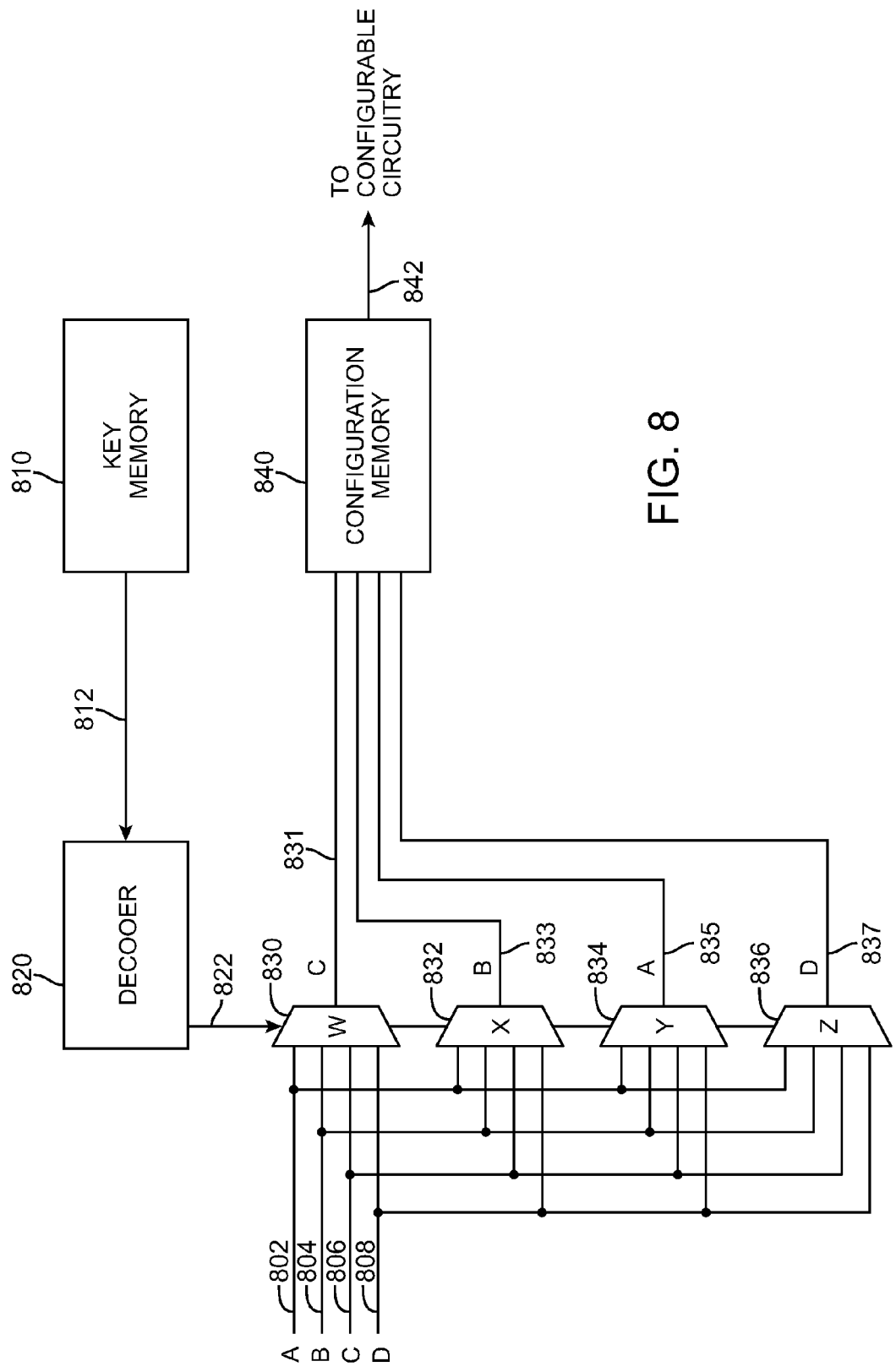

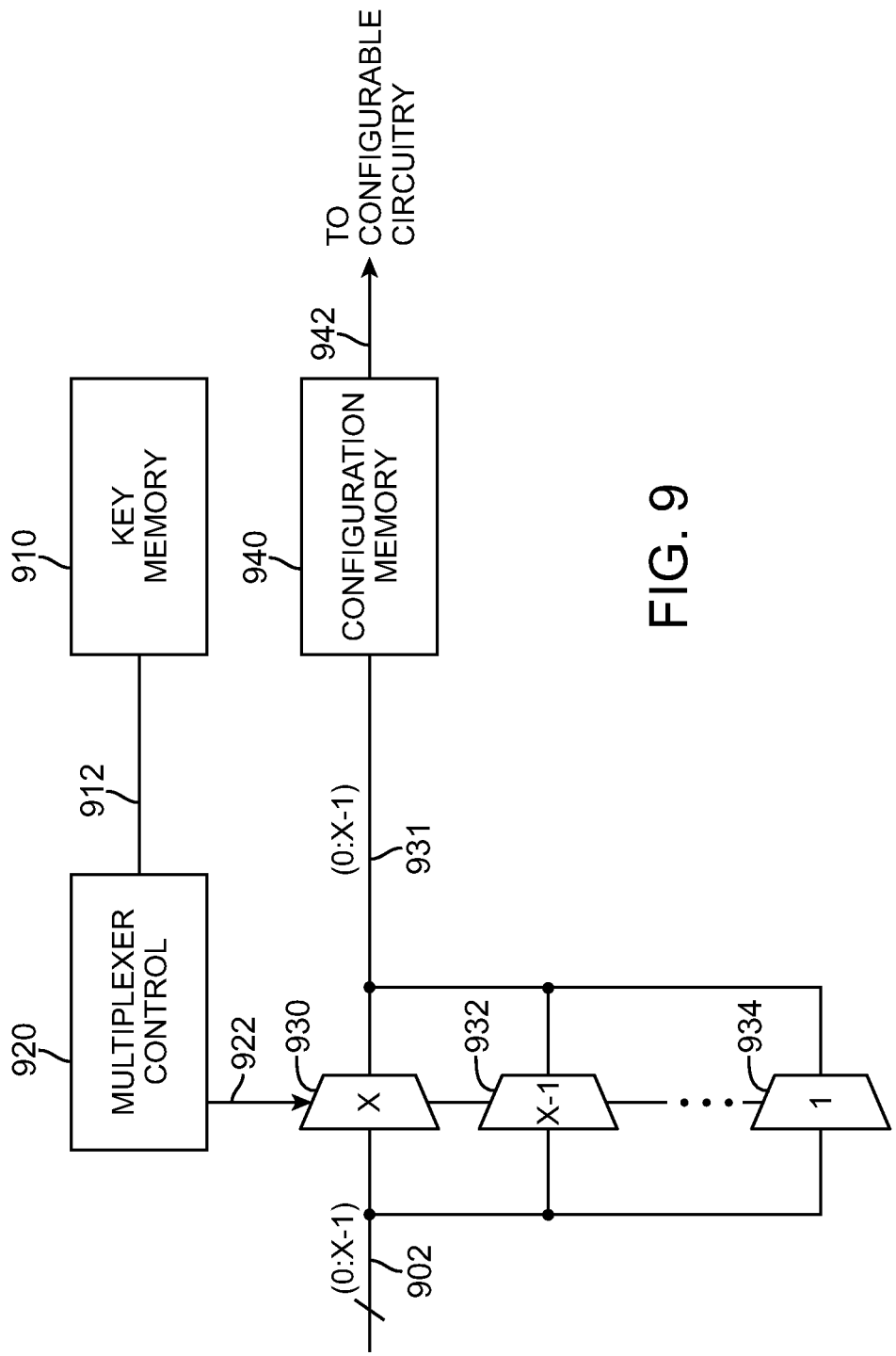

| 1110 | 1120 |
|---|---|
| KEY | W X Y Z |
| 0 0 | A B C D |
| 0 1 | B C D A |
| 1 0 | C D A B |
| 1 1 | D A B C |

FIG. 11A

| 1130 | 1140 |
|---|---|
| KEY | W X Y Z |
| 0 0 0 0 | A B C D |
| 0 0 0 1 | A B D C |
| 0 0 1 0 | A C B D |
| 0 0 1 1 | A C D B |
| 0 1 0 0 | A D B C |
| 0 1 0 1 | A D C B |
| 0 1 1 0 | B A C D |
| 0 1 1 1 | B A D C |
| 1 0 0 0 | B C A D |
| 1 0 0 1 | B C D A |
| 1 0 1 0 | B D A C |
| 1 0 1 1 | B D C A |
| 1 1 0 0 | C A B D |
| 1 1 0 1 | C A D B |
| 1 1 1 0 | C B A D |
| 1 1 1 1 | C B D A |
|  | C D A B |
|  | C D B A |
|  | D A B C |
|  | D A C B |
|  | D B A C |
|  | D B C A |
|  | D C A B |
|  | D C B A |

UNUSED I/P COMBINATIONS 1150

FIG. 11B

FPGA CONFIGURATION DATA SCRAMBLING USING INPUT MULTIPLEXERS

BACKGROUND

The present invention relates to configuring field programmable gate arrays generally, and more particularly to protecting configuration bitstreams from detection.

Field programmable gate array devices are logic or mixed signal devices that may be configured to provide a desirable user-defined function. FPGAs are currently configured by receiving configuration data from a configuration device. This configuration data may be referred to as a configuration bitstream or program object file (POF). The configuration bitstream opens and closes switches formed on the FPGA such that a desired electrical connections are made or broken, thereby configuring the device.

Modern FPGAs contain hundreds of thousands of logic gates, as well as processors, memories, dedicated analog function blocks, and other circuits. This large amount requires a similarly large configuration bitstream to configure it. For example, 50 megabits of configuration data are now needed by some FPGAs.

The configuration data needed represents a huge investment in manpower and research and development costs, often in the million dollar range. To protect this investment, configuration bitstreams are often encrypted. The encrypted bitstream is decrypted using a key stored on the FPGA, and the FPGA is then configured. When the FPGA receives a configuration bitstream, the bitstream that is susceptible to detection is thus protected.

Unfortunately, encryption circuitry can be very complex, thus consuming a large amount of area on an integrated circuit. This adds to the cost of each FPGA and also increases device power dissipation.

Thus what is needed are comparatively less complicated circuits, methods, and apparatus for protecting a configuration bitstream from detection.

SUMMARY

Accordingly, embodiments of the present invention provide circuits, methods, and apparatus that provide for protection of configuration bitstreams from detection. One exemplary embodiment provides for receiving a scrambled configuration bitstream with an integrated circuit. The scrambled configuration bitstream is descrambled using a plurality of multiplexers under control of a security key. The key can be stored on the same integrated circuit, for example in a nonvolatile memory or fuse array. The descrambled configuration bitstream is then used to configure the integrated circuit.

A configuration bitstream is typically received in portions since they are too large to be received all at once. One specific embodiment uses a key stored in memory to control a bank of multiplexers that descramble each of the received portions of the configuration bitstream. Other embodiments store longer keys, and use portions of the keys to descramble one or more portions of their respective configuration bitstreams.

In these embodiments, the outputs of the multiplexers are stored in configuration memory cells, where each descrambled portion of the configuration bitstream is further multiplexed to different configuration memory cells. These configuration memory cells can be placed together, or placed at various points in an integrated circuit near the circuitry they are responsible for configuring. Various embodiments of the present invention may incorporate one or more of these or the other features described herein.

A better understanding of the nature and advantages of the present invention may be gained with reference to the following detailed description and the accompanying drawings.

BRIEF DESCRIPTION OF THE DRAWINGS

FIG. 8 is a schematic of an exemplary implementation of the present invention;

FIG. 9 is a schematic of a more general implementation of the present invention;

FIGS. 11A and 11B are truth tables illustrating methods of decoding bits of a key or key portion to descramble portions of a configuration bitstream according to an embodiment of the present invention.

DESCRIPTION OF EXEMPLARY EMBODIMENTS

Figure 1:
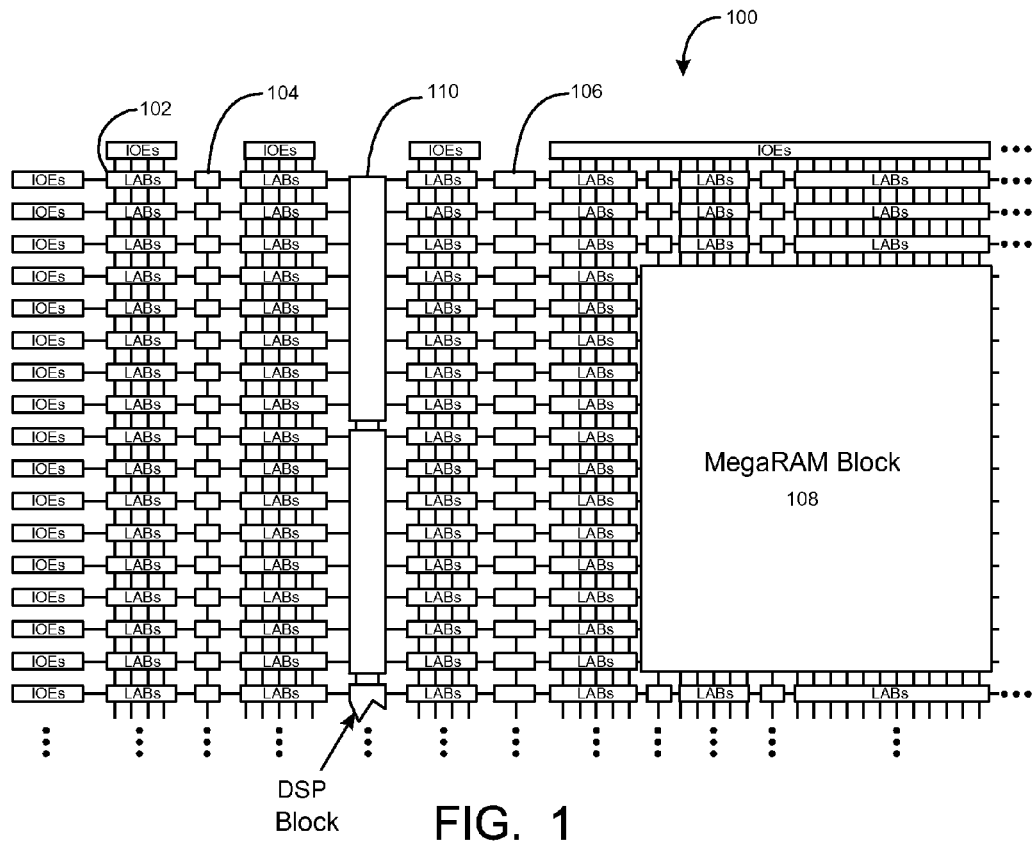
FIG. 1 is a simplified block diagram of a programmable logic device that may benefit by incorporating embodiments of the present invention.

FIG. 1 is a simplified partial block diagram of an exemplary high-density programmable logic device 100 wherein techniques according to the present invention can be utilized. PLD 100 includes a two-dimensional array of programmable logic array blocks (or LABs) 102 that are interconnected by a network of column and row interconnections of varying length and speed. LABs 102 include multiple (e.g., 10) logic elements (or LEs), an LE being a small unit of logic that provides for efficient implementation of user defined logic functions.

PLD 100 also includes a distributed memory structure including RAM blocks of varying sizes provided throughout the array. The RAM blocks include, for example, 512 bit blocks 104, 4K blocks 106 and an M-Block 108 providing 512K bits of RAM. These memory blocks may also include shift registers and FIFO buffers. PLD 100 further includes digital signal processing (DSP) blocks 110 that can implement, for example, multipliers with add or subtract features. I/O elements (IOEs) 112 are located around the periphery of the device.

It is to be understood that PLD 100 is described herein for illustrative purposes only and that the present invention can be implemented in many different types of PLDs, FPGAs, and the other types of digital integrated circuits.

Figure 2:
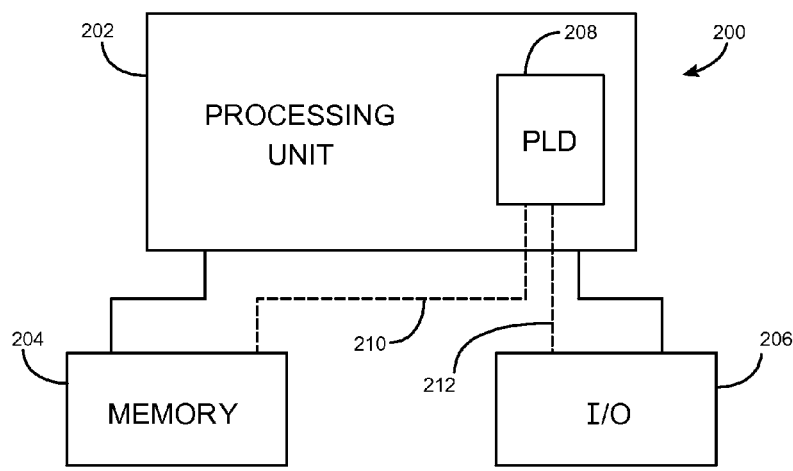
FIG. 2 is a block diagram of an electronic system that may benefit by incorporating embodiments of the present invention.

While PLDs of the type shown in FIG. 1 provide many of the resources required to implement system level solutions, the present invention can also benefit systems wherein a PLD is one of several components. FIG. 2 shows a block diagram of an exemplary digital system 200, within which the present invention may be embodied. System 200 can be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 200 may be provided on a single board, on multiple boards, or within multiple enclosures.

System 200 includes a processing unit 202, a memory unit 204 and an I/O unit 206 interconnected together by one or more buses. According to this exemplary embodiment, a programmable logic device (PLD) 208 is embedded in processing unit 202. PLD 208 may serve many different purposes within the system in FIG. 2. PLD 208 can, for example, be a logical building block of processing unit 202, supporting its internal and external operations. PLD 208 is programmed to implement the logical functions necessary to carry on its particular role in system operation. PLD 208 may be specially coupled to memory 204 through connection 210 and to I/O unit 206 through connection 212.

Processing unit 202 may direct data to an appropriate system component for processing or storage, execute a program stored in memory 204 or receive and transmit data via I/O unit 206, or other similar function. Processing unit 202 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 208 can control the logical operations of the system. In an embodiment, PLD 208 acts as a reconfigurable processor, which can be reprogrammed as needed to handle a particular computing task. Alternately, programmable logic device 208 may itself include an embedded microprocessor. Memory unit 204 may be a random access memory (RAM), read only memory (ROM), fixed or flexible disk media, PC Card flash disk memory, tape, or any other storage means, or any combination of these storage means.

FIGS. 3A and 3B illustrate circuits and software that may be improved by incorporating embodiments of the present invention. These circuits and software may be used to provide encrypted configuration information to field programmable gate arrays. Specifically, FIG. 3A illustrates the loading of an encrypted bitstream into a configuration device and a key into a field programmable gate array, while FIG. 3B illustrates the loading of the encrypted bitstream from the configuration device to the FPGA.

FIG. 3A includes a software package 320 that further includes encryption software 322 and key storage and handling software 324, a configuration device for storing an encrypted bitstream 332, and a field programmable gate array including storage locations for key storage 342 and decryption hardware 344. A bitstream is loaded into the encryption software routine 322 via software interface 305. The encryption software encrypts the bitstream and provides an encrypted bitstream through interface 307 to the configuration device 330, where it is stored as an encrypted bitstream 332. Similarly, a key is provided by a user over interface 310 to key handling software 324 which provides the key over interface 321 to the FPGA 340. The key is stored in locations 342 for use by the decryption hardware 344.

FIG. 3B includes a configuration device that further includes encrypted bitstream 332, and a field programmable gate array 340 including key storage 342, decryption hardware 344, and a decrypted bitstream 346. At power up, during a fault condition, or other appropriate time, the encrypted bitstream 332 is provided by the configuration device 330 over interface 350 to the decryption hardware 344 in the field programmable gate array 340. The decryption hardware 344 also receives the key 342 stored on the field programmable gate array 340 and provides a decrypted bitstream 346. The decrypted bitstream 346 is then used to configure the FPGA such that it provides the desired logic function.

Figure 3:
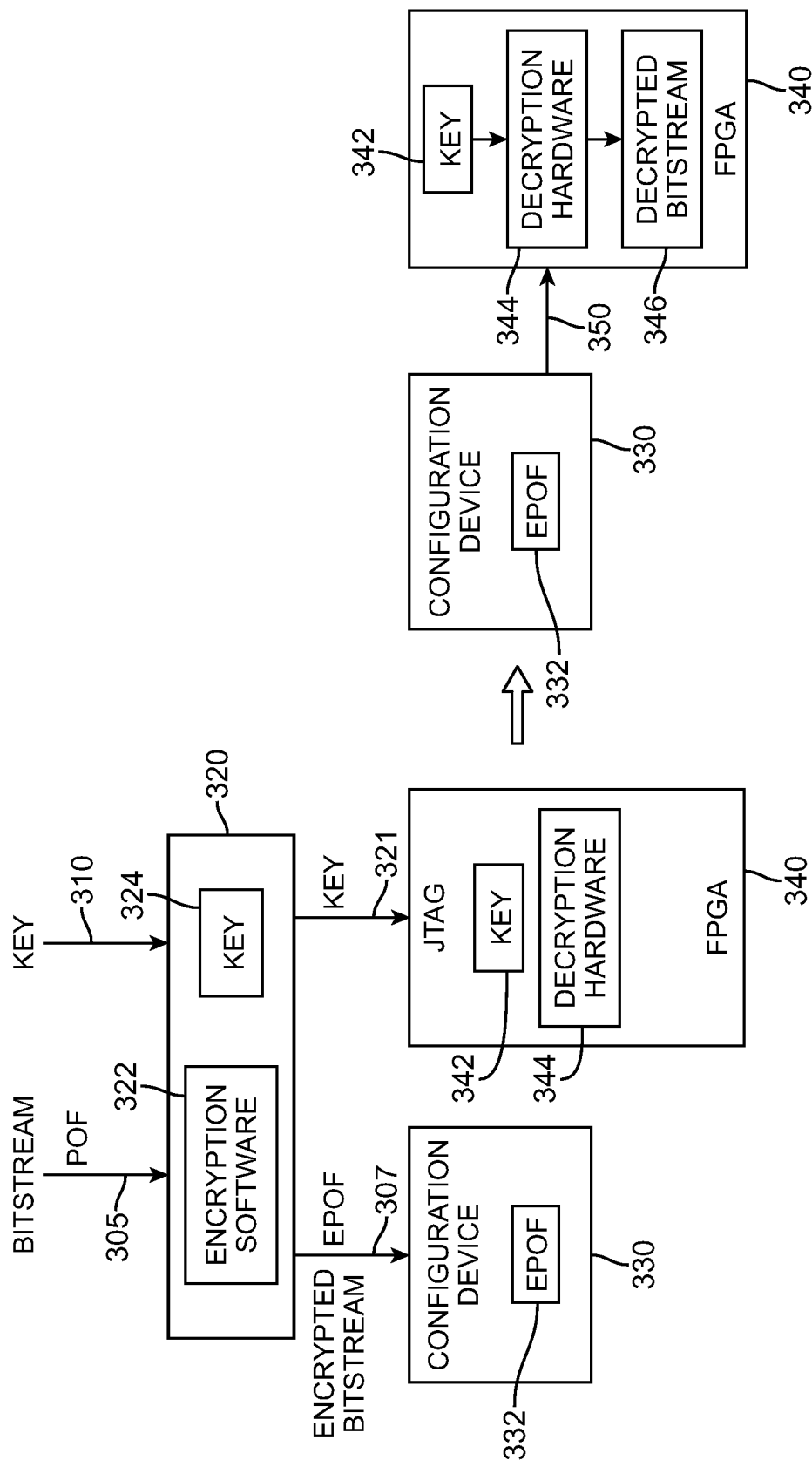
FIGS. 3A and 3B illustrate circuits and software that may benefit by incorporating embodiments of the present invention.

In typical applications, the activities illustrated in FIG. 3 occur either at a location (for example, their factory) under control of the field programmable gate array manufacturer (vendor) or purchaser, while the activities illustrated in FIG. 3B occur once the field programmable gate array is incorporated in an end product. Accordingly, since only the encrypted bitstream is available for detection over interface 350 in FIG. 3B, the original un-encrypted bitstream is protected from discovery.

Figure 4:
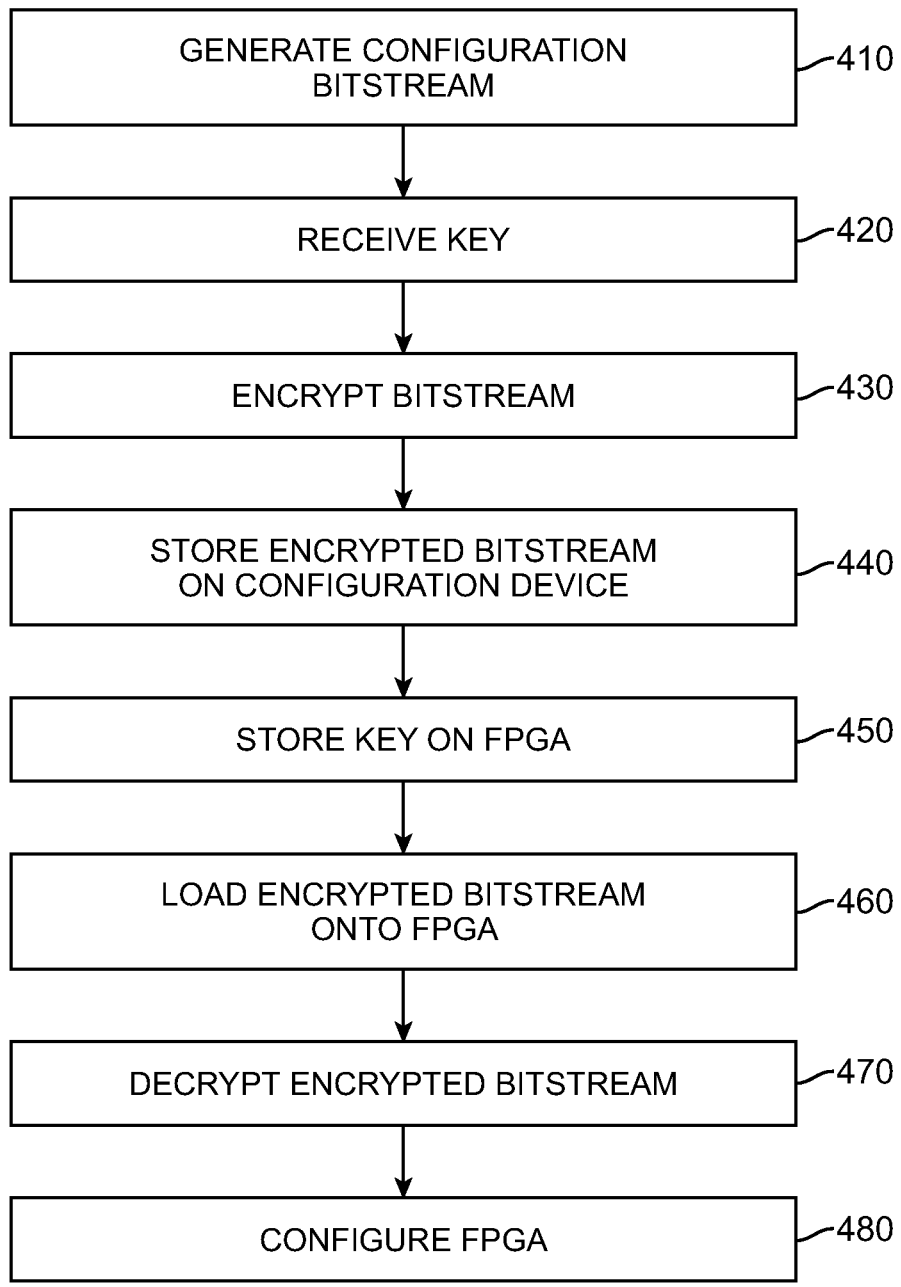
FIG. 4 illustrates a method of configuring a field programmable gate array that may be improved by incorporating embodiments of the present invention.

FIG. 4 illustrates a method of configuring a field programmable gate array that may be improved by incorporating embodiments of the present invention. In act 410, a configuration bitstream is generated. The configuration bitstream may be generated using design software such as VHDL (Very High Speed Integrated Circuit Hardware Description) Language or Verilog. In act 420, an encryption key is received, for example from a user, database, look-up table or other source. Alternately, the software program may generate its own key, or suggest a key to the user. In act 430, the key is used to encrypt the configuration bitstream, and in act 440, the encrypted bitstream is stored on a configuration device. This configuration device may be a flash memory or other nonvolatile memory device, such as a memory with a self-contained battery backup. The configuration device may be an integrated circuit, compact flash card, or other device. In act 450, the key is stored on a field programmable gate array or other programmable or configurable device. The acts to this point are typically performed at a location under the control of the field programmable gate array vendor or purchaser such as an original equipment manufacturer (OEM).

The following acts typically occur at power up, after a fault or error condition, or at other appropriate times while the FPGA is in use in an electrical system. In act 460, the encrypted bitstream is loaded from the configuration device to the field programmable gate array. In act 470, the encrypted bitstream is decrypted in the FPGA and used to configure the FPGA in act 480. This configuration act configures the FPGA such that it performs the desired function.

Figure 5:
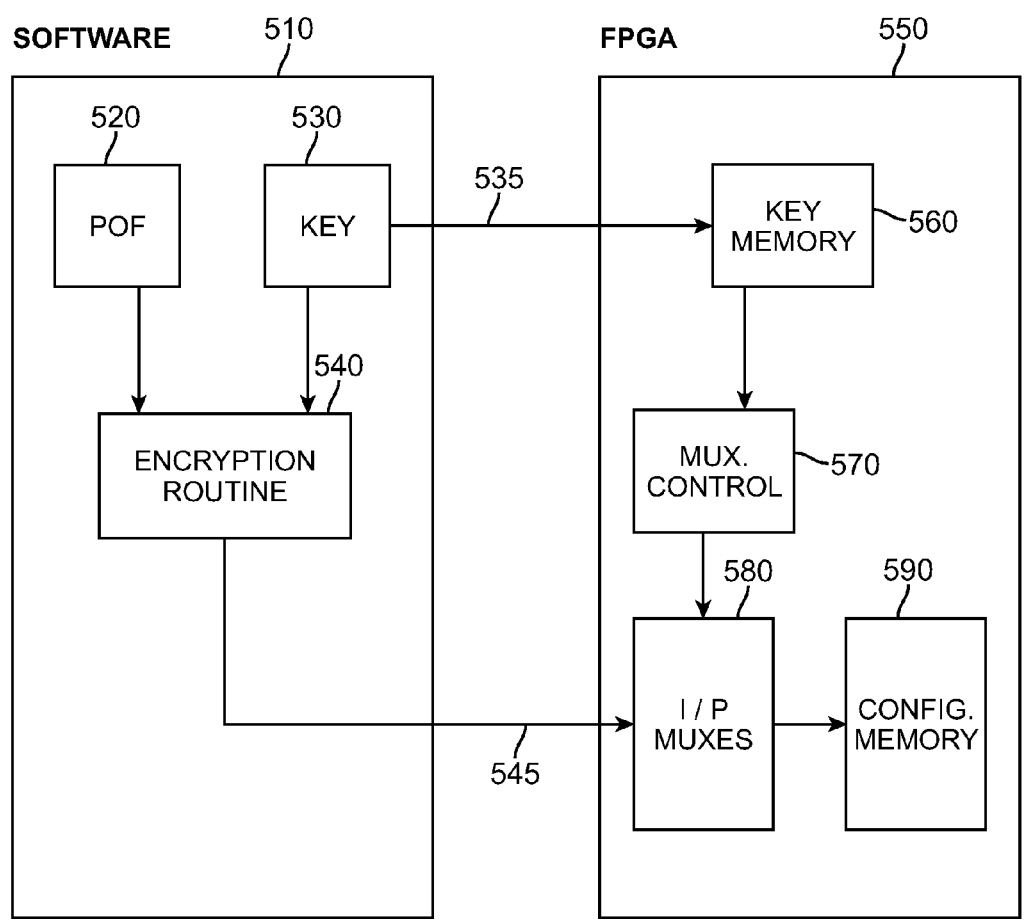
FIG. 5 illustrates an FPGA and supporting software that incorporate an embodiment of the present invention.

FIG. 5 illustrates an FPGA and supporting software that incorporate an embodiment of the present invention. This figure includes a software package or collection of modules 510 and FPGA 550. The software may be, for example, Quartus® design software that has been developed by Altera Corp., located in San Jose Calif. Similarly, the FPGA may be one of the many FPGA products offered by Altera Corp.

A programming object file or configuration bitstream 520 is received or generated by the software 510. Similarly, a key 530 is generated or received by the software 510. The configuration bitstream 520 is encrypted or scrambled using the key 530 by the encryption routine 540. The key 530 is provided to the FPGA 550 on line 535. The key 530 may be received by the FPGA 550 via a JTAG or other input port. The key 530 is stored in a key memory 560 on the FPGA 550.

During configuration, the key 530 is retrieved from a key memory 560 and provided to a multiplexer control circuit 570. The encrypted or scrambled bitstream is received on lines 545 by the input multiplexers 570. Lines 545 may connect to input port of the FPGA 550, such as a JTAG or other input port. The input multiplexers 580 descrambled the configuration bitstream received on lines 545, and provides the decrypted bitstream to the configuration memory 590. The configuration memory 590 in turn provides signals that open or close switches that control interconnect lines and logic elements on the FPGA 550.

In this embodiment, the key 530 is stored directly in key memory 560 on the FPGA 550. In other embodiments, two or more keys may be encrypted with each other to generate a third key that is stored in a key memory 560. Similarly, the key 530 stored in key memory 560 is shown as being provided directly to the mux control 570. In other embodiments, the key may first be descrambled before, or after, being provided to the multiplexer control 570. Similarly, the key may be obfuscated before being stored in the key memory 560 and regenerated after being stored in the key memory 560.

Also in this embodiment, software 510 directly provides a configuration bitstream on lines 545 to the input multiplexes 580. In other embodiments, the encrypted or scrambled bitstream may first be stored in a configuration device. This configuration device may be an integrated circuit separate from the FPGA 550. The configuration device may be on the same board or may be remote from the location of the FPGA 550. For example, a configuration device, or configuration software, may configure the FPGA 550 remotely over phone or Internet lines.

Figure 6:
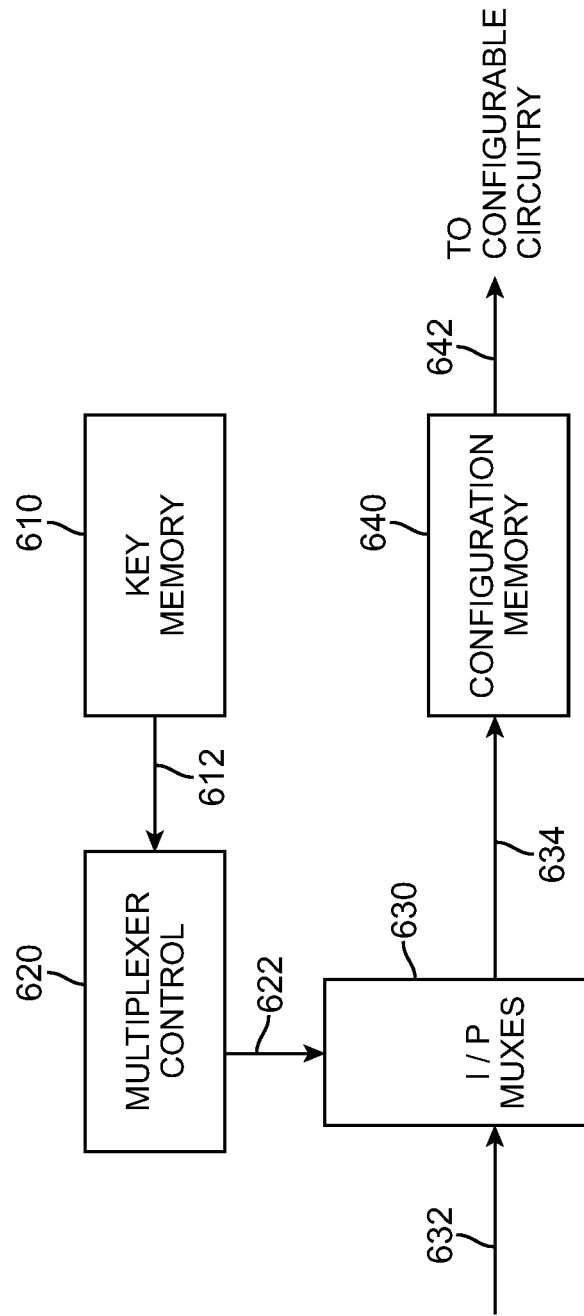
FIG. 6 is a block diagram of a portion of an integrated circuit consistent with an embodiment of the present invention.

FIG. 6 is a block diagram of a portion of an integrated circuit consistent with an embodiment of the present invention. The circuitry shown in this block diagram may be a portion of an FPGA or other type of configurable integrated circuit. This integrated circuit portion includes a key memory 610, multiplexer control circuit 620, input multiplexers 630, and configuration memory 640.

The key memory 610 stores a key that is used to decrypt or descramble an incoming encrypted or scrambled configuration bitstream. The key memory 610 may be a poly-fuse array. Alternately, it may be a nonvolatile memory such as an EEPROM. Typically, the key is not accessible from outside the chip, it is only provided to on-chip circuits. Further, the memory may be write disabled such that the key cannot be overwritten.

The key memory 610 provides a key on line 612 to a multiplexer control circuit 620. In various embodiments, instead of providing the key directly to the multiplexer control circuit 620, other encryption or de-obfuscation circuitry may be inserted between the key memory 610 and the multiplexer control 620. The multiplexer control 620 in turn provides control or select signals on lines at 622 to the input multiplexers 630.

The input multiplexers 630 receive these encrypted or scrambled bitstream on lines 632. Lines 632 may be part of the input port such as a JTAG or other type of port. The input multiplexers 630 decrypt or descrambled the configuration bitstream and provide outputs on lines 634 to the configuration memory 640. Typically, the scrambled configuration bitstream is received in portions. Accordingly, as these portions are decrypted, they are multiplexed or otherwise routed to different configuration memory storage locations. The configuration memory 640 provides configuration bits on at 642 to the programmable interconnect, logic elements, or other configurable circuitry on the integrated circuit.

Figure 7:
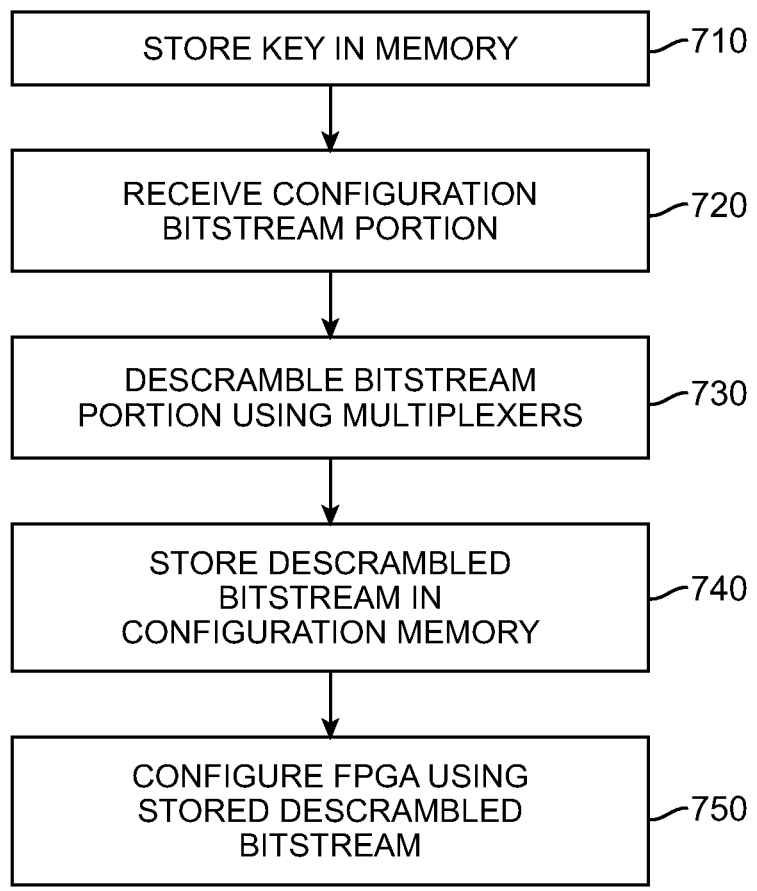
FIG. 7 is a flow chart illustrating a method of configuring an FPGA consistent with an embodiment of the present invention.

FIG. 7 is a flow chart illustrating a method of configuring an FPGA consistent with an embodiment of the present invention. In act 710, a key is stored in a memory. Typically the memory is located on a integrated circuit that is at least partially configurable, such as an FPGA. An encrypted or scrambled configuration bitstream portion is received in act 720. Typically, a configuration bitstream is far too large to be received all at once. Therefore, the configuration bitstream is received in portions. For example, one or more bytes of a configuration bitstream may be received at an input port of the FPGA or other configurable device at a time.

In act 730, the bitstream is decrypted or descramble using a plurality of multiplexers. The descramble bitstream portion is stored in a configuration memory in act 740. In act 750, the stored bits in the configuration memory are then used to configure circuitry such as interconnect or logic elements on the integrated circuit.

FIG. 8 is a schematic of an exemplary implementation of the present invention. This schematic includes a key memory 810, a decoder or multiplexer control circuit 820, multiplexers 830, 832, 834, and 836, and configuration, memory 840.

The key memory 810 provides a key on lines 812 to the decoder 820. Decoder 820 provides control or select signals on lines 822 to the multiplexers 830, 832, 834, and 836. Multiplexers 830, 832, 834, and 836 receive inputs A, B, C, and D on lines 802, 804, 806, and 808. These multiplexers provide outputs on lines 831, 833, 835, and 837 to the configuration memory 840. In this particular example, the inputs A, B, C, and D are descrambled as C, B, A, and D as shown. In this particular example, four multiplexers are shown as descrambling four input lines. In other embodiments of the present invention, other numbers of multiplexers may be used to descramble other numbers of input lines. The number of input lines and the number of multiplexers may be the same, or alternately they may be different.

Again, the configuration bitstream is typically too large to be received at one time, therefore it is received in portions. Accordingly, the outputs of the multiplexers 830, 832, 834, and 836 are further multiplexed to different configuration memory locations 840. These further multiplexers may be part of the decryption scheme. For example, these secondary multiplexers may be under control of the decoder 820. The configuration memory 840 provides configuration bits on lines 842 to configurable circuitry elsewhere in the remainder of the integrated circuit.

FIG. 9 is a schematic of a more general implementation of the present invention. This schematic includes a key memory 910, multiplexer control 920, multiplexers 930, 932, and 934, and a configuration memory 940.

Again, the key memory 910 provides a key on lines 912 to multiplexer control circuit 920. The multiplexer control circuit 920 provides control or select lines to the multiplexers 930, 932, and 934. Multiplexers 930, 932, and 934 receive a number of inputs on lines 902 and provides outputs on lines 931 to a configuration memory 940. The configuration memory 940 in turn provides a number of configuration bits to configurable circuitry elsewhere on the integrated circuit on line 942.

Various embodiments of the present invention use the key or portions of the key stored in the key memory 910 in different ways to decrypt or descramble the configuration bitstream. For example, there are various ways that the key in the key memory 910 may be retrieved. One embodiment of the present invention reads the entire key out of the key memory 910 on lines 912 and uses those bits to decrypt or descramble each of the received portions of a configuration bitstream on lines 902. Other embodiments read further portions of the key from the key memory 910 for each received portion of the configuration bitstream. For example, if 8 bits of key memory are used to decrypt or descramble a first portion of a received configuration bitstream, between one and 8 bits of key memory may be read out and used to replace some or all of the previously used key bits when the next configuration bits in portion is received. Alternately, portions of the key stored in key memory 910 may be read out and used for some number of received portions of the configuration bitstream.

Figure 10A:
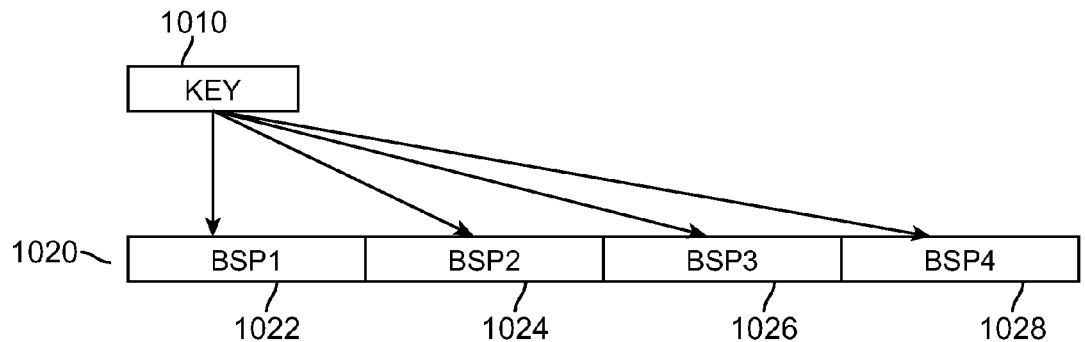
FIGS. 10A, 10B, and 10C illustrate methods of using a key or portions of a key to descramble a configuration bitstream according to an embodiment of the present invention.
Figure 10B:
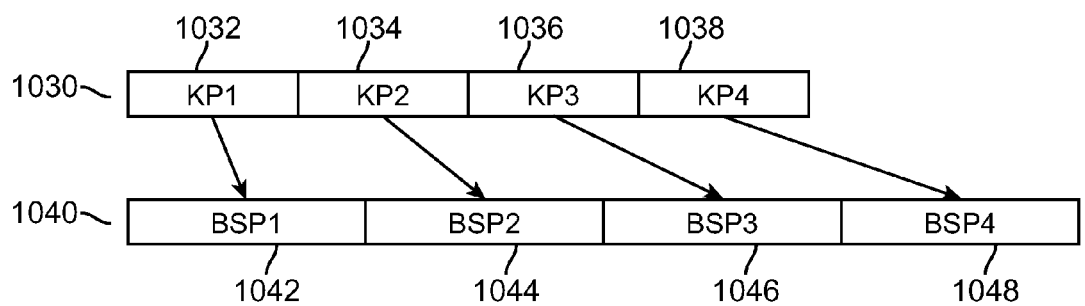
Figure 10C:
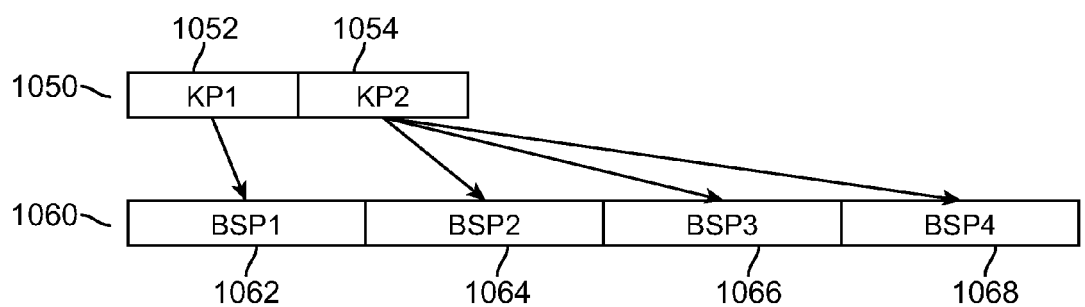

FIGS. 10A, 10B, and 10C illustrate methods of using a key or portions of a key to descramble a configuration bitstream according to an embodiment of the present invention. In FIG. 10A, an entire key 1010 is used to scramble or decrypt portions of the configuration bitstream 1020. For example, the key 1010 is used to decrypt bitstream portions BSP1 1022, BSP2 1024, BSP3 1026, and BSP4 1028.

In FIG. 10B, various portions of the key 1030 are used to decrypt portions of the configuration bitstream 1040. In this specific example, a portion of the key 1030, specifically KP1 1032 is used to decrypt a portion of the bitstream 1040, specifically BSP1 1042. Similarly portions KP2 1034, KP3 1036, and KP4 1038, are used to decrypt bitstream portions BSP2 1044, BSP3 1046, and BSP4 1048, respectively.

In FIG. 10C, different portions of the key 1050 are used to decrypt various numbers of portions of the bitstream 1060. Specifically, one portion of the key 1050, KP1 1052 is used to decrypt one portion of the configuration bitstream 1060, specifically BSP1 1062, while a second portion of the key KP2 1054 is used to decrypt bitstream portions BSP2 1064, BSP3 1066, and BSP4 1068.

It will be appreciated by one skilled in the art that variations on these examples are possible. For example, key portions KP2 1034 and KP2 1054 may share one or more bits with key portions KP1 1032 and KP1 1052. In these figures, the portions of the bitstreams are shown as being longer than the corresponding key or key portions. In other examples, these lengths may be the same, or the key or key portions may be longer than the corresponding bitstream portions.

Also, different levels of complexity of multiplexing may be achieved depending on how many bits of the key are used by the multiplexer control circuit 920 in FIG. 9. In short, given X inputs to X multiplexers, there are X! possible input selections. As one example, a particular input of the multiplexer 930 may be selected. Based on that selection, the other multiplexers may select inputs in a fixed fashion. In this case, if X bits are received on lines 902, only $\log_2(x)$ bits are needed by the multiplexer control circuit 920. Alternately, X bits on line 912 from key memory 910 may be used by the multiplexer control circuit 920. In this case, there are $2^{\wedge}X$ input combinations that may be selected out of the X! total that are possible. Alternately, N bits may be used to where:

$$N = RU(\log_2(X!)),\quad \text{equation 1}$$

where RU is a symbol meaning round up to the next largest integral value.

FIGS. 11A and 11B are truth tables illustrating methods of decoding bits of a key or key portion to descramble portions of a configuration bitstream according to an embodiment of the present invention. In FIG. 11A, for each key 1110, the selected input for the multiplexers 1120 are listed. In this example, once the input for multiplexer W is selected, the rest are determined. Accordingly, only two bits are needed to determine the selection for all the multiplexers 1120.

In FIG. 11B, a four bit key 1130 is made available to control the selection of the inputs for multiplexers 1140. A four bit key means $2^{\wedge}4$ or 16 possible input combinations may be selected. In this example, four multiplexers 1140 have four inputs, thus there are 4! or 24 possible input selections. In this example, the 8 unused combinations 1150 are shown.

Equation 1 from above may be solved:

$$N = RU(\log_2(4!)) = RU(\log_2(24)) = 5.$$

Accordingly, a key of 5 bits could be used, allowing a total of 32 possible input combinations to be used. This is more than enough to cover the 24 combinations of the present example.

Figure 12:
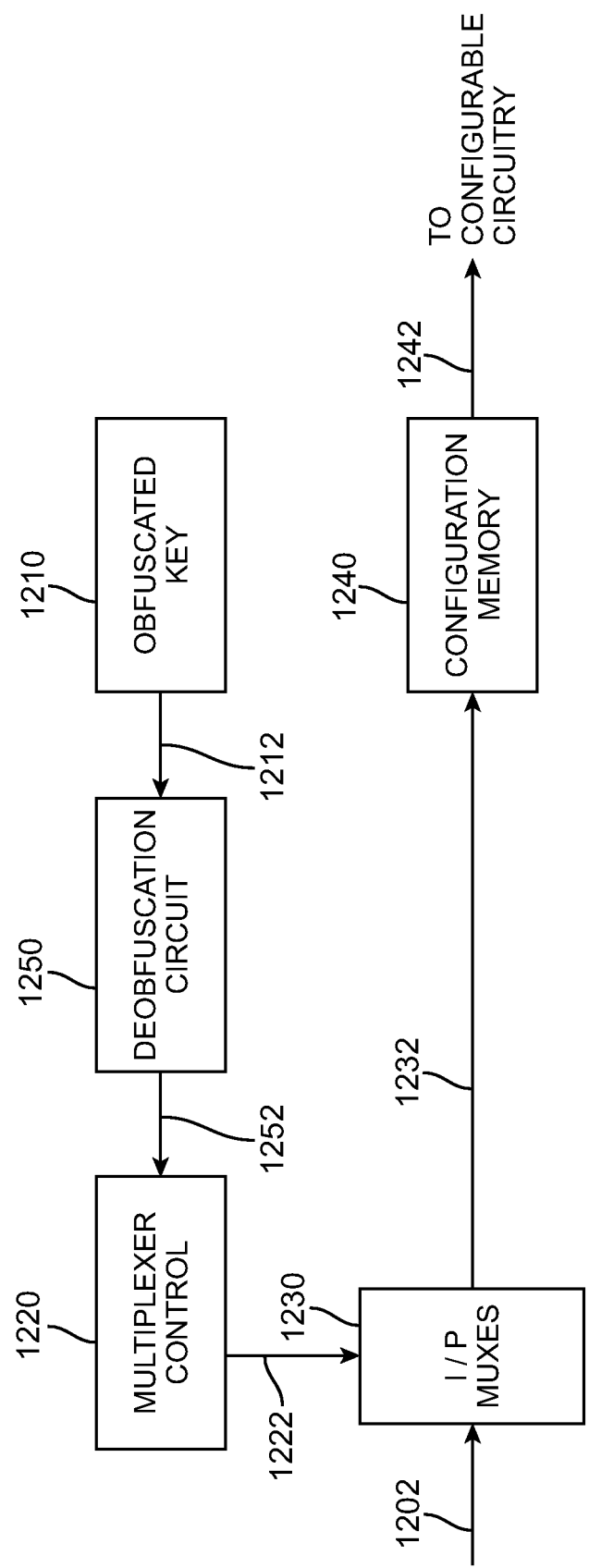
FIG. 12 is a block diagram of a portion of an integrated circuit consistent with another embodiment of the present invention.

FIG. 12 is a block diagram of a portion of an integrated circuit consistent with another embodiment of the present invention. Again, the circuitry shown in this block diagram may be a portion of an FPGA or other type of configurable integrated circuit. This integrated circuit portion includes a key memory 1210, multiplexer control circuit 1220, input multiplexers 1230, configuration memory 1240, and de-obfuscation circuit 1250.

The key memory 1210 stores a key that is obfuscated to protect the identity of the key. In this example, if the key is recovered, for example by a reverse engineering process, the identity of the key used to descramble or decrypt the incoming bitstream is hidden. As before, the key memory 1210 may be a poly-fuse array. Alternately, it may be a nonvolatile memory such as an EEPROM for example, where the write control circuitry has been disabled to prevent modification of the existing key in key memory.

The key memory 1210 provides an obfuscated key on line 1212 to a de-obfuscation circuit 1250. This circuit may be a permutation and inversion circuit (or reverse permutation and inversion circuit), an encryption circuit such as a circuit used to implement the advanced encryption standard (AES), or other circuit.

The de-obfuscation circuit 1250 provides a de-obfuscated key to a multiplexer control circuit 1220 on line 1252. The multiplexer control 1220 in turn provides control or select signals on lines at 1222 to the input multiplexers 1230.

The input multiplexers 1230 receive these encrypted or scrambled bitstream on lines 1202. Lines 1202 may be part of the input port such as a JTAG or other type of port. The input multiplexers 1230 decrypt or descrambled the configuration bitstream and provide outputs on lines 1232 to the configuration memory 1240. The configuration memory 1240 provides configuration bits on lines 1242 to the programmable interconnect, logic elements, or other configurable circuitry on the integrated circuit.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of configuring a configurable integrated circuit comprising:
   retrieving a key from a first memory in the integrated circuit;
   receiving configuration data at an input port to the integrated circuit; and descrambling the configuration data by multiplexing the configuration data,
wherein the configuration data is multiplexed under control of the key retrieved from the memory.

2. The method of claim 1 wherein the configuration data is descrambled by multiplexing the configuration data such that bits of the configuration data are reordered.

3. The method of claim 1 further comprising:
storing the multiplexed configuration data in a second memory; and
configuring the configurable integrated circuit using the multiplexed configuration data in the second memory.

4. The method of claim 3 further comprising:
before retrieving the key from the first memory, receiving key information at the input port to the configurable integrated circuit; and
storing the key in the first memory.

5. The method of claim 1 wherein the first memory is a nonvolatile memory.

6. The method of claim 5 wherein the first memory is a fuse array.

7. The method of claim 1 wherein the input port to the configurable integrated circuit is a JTAG port.

8. The method of claim 1 wherein the configurable integrated circuit is a field-programmable gate array.

* * * * *